(12) United States Patent
Wolf (10) Patent No.: US 11,258,090 B2
(45) Date of Patent: Feb. 22, 2022

(54) CONNECTING ELEMENT FOR ELECTRICALLY AND MECHANICALLY CONNECTING TWO ELECTROLYTIC CELL STACKS, AND ELECTROLYSIS DEVICE

(71) Applicant: Siemens Aktiengesellschaft, Munich (DE)

(72) Inventor: Erik Wolf, Rottenbach (DE)

(73) Assignee: Siemens Aktiengesellschaft, Munich (DE)

( * ) Notice: Subject to any disclaimer, the term of this patent is extended or adjusted under 35 U.S.C. 154(b) by 86 days.

(21) Appl. No.: 16/762,742

(22) PCT Filed: Nov. 19, 2018

(86) PCT No.: PCT/EP2018/081732
§ 371 (c)(1),
(2) Date: May 8, 2020

(87) PCT Pub. No.: WO2019/101681
PCT Pub. Date: May 31, 2019

(65) Prior Publication Data
US 2021/0175533 A1 Jun. 10, 2021

(30) Foreign Application Priority Data
Nov. 24, 2017 (EP) .................................... 17203521

(51) Int. Cl.
*H01M 8/249* (2016.01)
*H01M 8/2483* (2016.01)
(Continued)

(52) U.S. Cl.
CPC .............. *H01M 8/249* (2013.01); *C25B 9/66* (2021.01); *H01M 8/04029* (2013.01); *H01M 8/2483* (2016.02); *H01M 8/2484* (2016.02)

(58) Field of Classification Search
CPC ..................................................... H01M 8/249
See application file for complete search history.

(56) References Cited

U.S. PATENT DOCUMENTS

| 5,292,405 A | 3/1994 | Wicks |
| 6,653,008 B1 * | 11/2003 | Hirakata ............... H01M 8/247 429/434 |
| 2008/0292936 A1 | 11/2008 | Silberbauer et al. |

OTHER PUBLICATIONS

Sequeira Cesar A.C. et al: "Hydrogen Production", C. Teen. Mat., vol. 22, No. 3-4, pp. 76-86, XP055470032, ISSN: 0870-8312, Figures 10,012; 2010.

(Continued)

*Primary Examiner* — Brian R Ohara
(74) *Attorney, Agent, or Firm* — Wolter Van Dyke Davis, PLLC (57) ABSTRACT

A connecting element electrically and mechanically connects two electrolytic cell stacks. An electrolysis device includes at least one connecting element of this type and the electrolytic cell stacks are connected by the connecting element. For the hydraulic connection of the electrolytic cell stacks, the connecting element has at least two hydraulic interfaces for each of two water circuits, which water circuits are independent of each other. Furthermore, the connecting element has electrical connection points electrically connected to each other, in order to connect the electrolytic cell stacks in a common circuit. By the connecting element, the connected electrolytic cell stacks can be hydraulically separated or connected to each other, depending on the design.

12 Claims, 2 Drawing Sheets

(51) Int. Cl.
*H01M 8/2484* (2016.01)
*H01M 8/04029* (2016.01)
*C25B 9/65* (2021.01)

(56) References Cited

OTHER PUBLICATIONS

International PCT Search Report and Written Opinion dated Feb. 11, 2019 regarding PCT/EP2018/081732 filed on Nov. 19, 2018.

\* cited by examiner

CONNECTING ELEMENT FOR ELECTRICALLY AND MECHANICALLY CONNECTING TWO ELECTROLYTIC CELL STACKS, AND ELECTROLYSIS DEVICE

CROSS REFERENCE TO RELATED APPLICATIONS

This application is the US National Stage of International Application No. PCT/EP2018/081732 filed 19 Nov. 2018, and claims the benefit thereof. The International Application claims the benefit of European Application No. EP17203521 filed 24 Nov. 2017. All of the applications are incorporated by reference herein in their entirety.

FIELD OF INVENTION

The invention relates to a connecting element for electrically and mechanically connecting two electrolytic cell stacks, and also an electrolysis device having such a connecting element.

BACKGROUND OF INVENTION

Electrolysis is a method presently often applied in various fields, in which, for example, water is split by an electric current to obtain hydrogen and oxygen. Electrolysis typically takes place in electrolytic cells, wherein multiple electrolytic cells can be combined to form a module. A plurality of electrolytic cells and/or a plurality of modules can be combined to form a so-called electrolytic cell stack.

Electrolytic cells are low-voltage-high-current consumers. A typical voltage level of an individual electrolytic cell or a typical voltage drop over an individual electrolytic cell in operation can typically be in the range of 1.8 VDC to 2.6 VDC, i.e., for example, 2 $V_D C$. In operation, i.e., during electrolysis, an actual electricity demand scales with an active area of the respective electrolytic cell, wherein the electricity demand can be, for example, 1 to 2 amperes per square centimeter ($A/cm^2$). Presently, electrolytic cells having an active area of greater than 1000 $cm^2$ are available and electrolytic cells having an active area of approximately 10,000 $cm^2$ are planned for the future. The electricity demand for such electrolytic cells can thus reach several tens of thousands of amperes. Electrolytic cells and/or corresponding electrolytic facilities or devices are often operated using DC voltage, which is generated from rectified AC voltage. Rectifiers are often used for this purpose, which use power semiconductors as functional components, the specific costs of which are typically dominated by the current carrying capacity thereof. The decisive parameter for a rectifier, in the case of a usage for electrolysis, is thus the respective price per ampere of direct current. A typical voltage range or a typical voltage level of corresponding rectifiers can be, for example, 1200-1500 VDC.

In principle, it would thus be advantageous to connect many electrolytic cells electrically in series, since thus the maximum possible voltage level of the respective upstream rectifier can be utilized and thus the efficiency of the respective electrolyzer, i.e., the respective electrolysis device, can be improved and/or optimized. However, for practical applications, a structural length of an individual electrolytic cell stack implementable with acceptable expenditure is mechanically limited. Thus, arbitrarily many individual electrolytic cells cannot be combined to form an electrolytic cell stack, but rather only a number predetermined by the manageable mechanical stability of the electrolytic cell stack. In the case of a greater structural length, i.e., a greater number of combined electrolytic cells, shearing off of the electrolytic cells and/or buckling of the electrolytic cell stack can occur, comparable to the Euler's buckling cases. This problem occurs since the individual electrolytic cells of an electrolytic cell stack are mechanically clamped with one another, wherein in the stack direction, i.e., in the direction of or along a stack axis extending perpendicularly to the parallel main extension planes of the individual electrolytic cells, as a function of a pressure-area ratio, pressure loads in the order of magnitude of several tens of tons can occur and/or be used. A further problem limiting the number of electrolytic cells connectable and/or arrangeable in series in an electrolytic cell stack is the manufacturing tolerances, for example, of respective frames of the individual electrolytic cells. The tolerances achievable for the corresponding frame thicknesses with acceptable expenditure can add up in a tolerance chain due to the combination of the plurality of electrolytic cells into the electrolytic cell stack. Thus, from a certain number of electrolytic cells, values and/or deviations can be reached overall which can no longer be tolerated.

In present electrolysis facilities, the structural-mechanical limitation of the length of the electrolytic cell stack and/or the corresponding number of combinable electrolytic cells and the non-optimal utilization accompanying this of the voltage which can be provided by typical rectifiers, with the relatively low efficiency accompanying this, and also the additional component and cost expenditure likewise accompanying this are simply accepted.

An electrolytic cell is known from U.S. Pat. No. 5,292,405 A, in which multiple planar electrodes are arranged in a first and a second stack of electrodes in an insulating housing. An electrolyte is supplied to the first stack through an inlet of the housing in this case. A corresponding outflow is discharged from the second stack through an outlet of the housing. The electrolyte flows through the two stacks in series in this case. Furthermore, the two stacks of electrodes are electrically contacted with opposing polarities in this case.

U.S. Pat. No. 6,653,008 B1 describes a fuel cell device having at least two cell stacks, a cooling mechanism, and a short-circuit device. The cooling mechanism has a supply opening and an outflow opening in this case, as well as a passage, which extends in a stack direction of the cell stacks. The short-circuit device is arranged to electrically short circuit the supply opening and the outflow opening.

SUMMARY OF INVENTION

The object of the present invention is to enable electrolysis operation which is more efficient than conventional electrolysis facilities.

This object is achieved according to the invention by the subjects of the independent patent claims. Advantageous designs and refinements of the invention are specified in the dependent patent claims and also in the description and in the drawings.

A connecting element according to the invention is used for electrically and mechanically connecting two electrolytic cell stacks. The connecting element comprises a rigid main body, which in turn comprises, for the hydraulic connection of at least one of the electrolytic cell stacks for a first water circuit, a first feed and a first drain and, for a second water circuit independent of the first water circuit, a second feed and a second drain. The connecting element thus comprises at least four hydraulic fittings or interfaces in the form of the feeds and drains for a total of at least two separate water circuits. For example, the one water circuit can be used to obtain hydrogen gas and the other water circuit can be used to obtain oxygen gas. Due to the separation of the water circuits, a separate water supply having respective adapted delivery or adapted inflow and outflow and/or adapted conditioning or preparation can then advantageously be implemented.

The connecting element moreover comprises electrical terminals, which are electrically conductively connected to one another, for electrically connecting the two electrolytic cell stacks. When electrolytic cell stacks are connected to the electrical terminals, the connecting element forms an electrical connection of the two electrolytic cell stacks in a shared circuit. Depending on design and demand, one electrical terminal or one electrical connection can be provided to connect one electrolytic cell stack in each case or multiple electrical terminals or connections can be provided per electrolytic cell stack. In any case, electrolytic cell stacks connected to the connecting element can be electrically connected to one another or coupled to one another by said connecting element.

Furthermore, the connecting element comprises mechanical connecting interfaces for mechanically connecting the electrolytic cell stack to the connecting element. The mechanical connecting interfaces are arranged in this case on opposing sides of the connecting element, so that when electrolytic cell stacks are mechanically connected to the connecting interfaces, the stack axes thereof extend in parallel to one another. The mechanical connecting interfaces can advantageously be arranged in such a way that the stack axes of connected electrolytic cell stacks extend and/or are arranged coaxially, i.e., they coincide. However, an offset arrangement can also be provided, in which the electrolytic cell stacks are still arranged on opposing sides of the connecting element, but the stack axes thereof actually extend in parallel, i.e., offset in relation to one another. Independently of the specific embodiment, a space-saving structure which is stackable particularly simply in a space-efficient manner with further, similar arrangements can be achieved by the parallel alignment of the stack axes. The mechanical connecting interfaces are used to mechanically couple the electrolytic cell stacks to the connecting element, so that a composite or an assembly is producible from the connecting element and the electrolytic cell stack or stacks connected thereto, i.e., an electrolysis device.

The mechanical connecting interfaces can advantageously be designed to establish a reversible mechanical connection or coupling of the electrolytic cell stacks. In this way, a modular, flexible structure of an electrolysis device or electrolysis facility can advantageously be implemented. Also—for example, for repair purposes—a replacement of an electrolytic cell stack and/or of the connecting element can advantageously be facilitated. The mechanical connecting interfaces can be designed in various ways, for example, as a plug, detent, or screw connection or receptacle, respectively, as a flange or flange connection, or the like. It can also be possible to combine the mechanical connecting interfaces with the electrical terminals, i.e., to unify them into an electrical-mechanical interface or an electrical-mechanical terminal. One or more such combined electrical-mechanical terminals or interfaces can be arranged in each case on each of the opposing sides of the connecting element which are provided for the arrangement of an electrolytic cell stack. A combined electrical-mechanical interface can advantageously facilitate the connection of electrolytic cell stacks to the connecting element, since fewer separate interfaces have to be correctly aligned with one another. It can be particularly advantageous to arrange multiple mechanical connecting interfaces on each of the two sides in order to enable a stable, reliable connection between the electrolytic cell stacks using the connecting element, and at the same time in each case to form only one of these connecting interfaces as a combined electrical-mechanical connection or interface per side. A complexity and a component and cost expenditure can advantageously be reduced in this way.

The connecting element according to the invention advantageously enables at least two electrolytic cell stacks to be electrically connected to one another, in particular to be electrically connected and/or arranged in series. The voltage or voltage level provided by a rectifier intended to operate the electrolytic cell stack can thus advantageously be utilized better, since a greater number of electrolytic cells can be connected or interconnected electrically effectively, in particular in series, than are arranged or can be arranged in a single electrolytic cell stack. The connecting element thus advantageously enables, by interconnecting or connecting electrolytic cell stacks and/or modules, the voltage level of a resulting overall formation or overall composite, i.e., an electrolysis device, to be adapted so that it optimally corresponds to the voltage level of a power supply, thus, for example, of the rectifier. This can improve the efficiency of an electrolysis device or electrolysis facility comprising multiple electrolytic cell stacks, in particular with respect to reduced cost, component, and maintenance expenditure and also with respect to electrical energy efficiency.

In addition to the improved utilization of the voltage level or voltage value, the fact that a less complex power supply, i.e., for example, fewer rectifiers, are required also contributes to this, whereby energy losses can be reduced. These effects can particularly advantageously be implemented by the use of the connecting element, without increasing the length of the individual electrolytic cell stacks and/or the number of the respective electrolytic cells installed therein, i.e., thus without reducing or endangering the mechanical stability of the electrolytic cell stacks.

In contrast to previous electrolysis facilities, in which multiple electrolytic cell stacks are arranged and operated independently of one another, a defined and fixed spatial alignment of the electrolytic cell stacks in relation to one another can advantageously be achieved in a particularly simple, space-saving, and reliable manner by the connecting element according to the invention, which can simplify capturing or collecting generated gas, for example, generated hydrogen and oxygen. In particular, hydrogen gas generated, for example, in both or all electrolytic cell stacks can thus particularly simply be captured in a shared first collection container or collection system and oxygen gas generated in both or all electrolytic cell stacks can be captured in a shared second collection container or collection system. Since moreover a separate electrical energy supply of the individual electrolytic cell stacks can be omitted, overall a complexity of an electrolysis device or facility having multiple electrolytic cell stacks can be reduced and thus also the manageability thereof can be improved by the connecting element according to the invention.

The connecting element can moreover advantageously offer a central, secure access point to an electrical system of all connected electrolytic cell stacks. It is particularly advantageous in this case that in the event of an interaction with this access, for example, to connect an external energy supply, the electrolytic cell stacks which are under mechanical tension do not themselves have to be interacted with. A risk of damage to the electrolytic cell stacks, for example, a risk of causing a leak, can thus also be reduced in a particularly simple manner by the connecting element, as can the risk of injury of respective operating or maintenance personnel.

A further advantage of the connecting element according to the invention is that a number of external electrical and/or hydraulic interfaces which are required and/or have to be made accessible for operating multiple electrolytic cell stacks can be reduced, since a bundled access to the corresponding electrical and/or hydraulic systems of the connected electrolytic cell stacks can be implemented in the connecting element.

A further advantage of the present invention is the scalability of electrolysis facilities enabled thereby. Such scaling is enabled with particularly little expenditure in this case, since simplified, standardized, and uniform electrolytic cell stacks can be coupled to one another flexibly and modularly in an arbitrary number as needed, wherein a connecting or attachment expenditure, i.e., an infrastructure expenditure, can be reduced in relation to the previously typical conventional procedure. For example, it can be possible by way of the use of multiple connecting elements to couple more than two electrolytic cell stacks to one another and/or electrically interconnect them in series. For this purpose, for example, an alternating arrangement of electrolytic cell stacks and connecting elements can be provided. The sequence electrolytic cell stack, connecting element, electrolytic cell stack, connecting element, electrolytic cell stack, etc. thus results.

A scaling in the transverse direction can also be possible, in which, for example, two or more electrolytic cell stacks on each of the opposing sides of the connecting element can be attached and/or connected thereto adjacent to one another. A particularly space-efficient arrangement and/or combination of a series circuit and a parallel circuit of electrolytic cell stacks can thus be implemented via the shared connecting element. Such an arrangement can also be simplified here in relation to an individual handling and contacting of individual electrolytic cell stacks, since the corresponding electrical and/or hydraulic interconnections or connections can already be implemented in the connecting element, so that to produce the desired arrangement and/or interconnection, the electrolytic cell stacks solely have to be connected to the connecting element and do not have to be individually contacted.

In particular for electrolysis facilities, in which a plurality of electrolytic cell stacks is operated, the connecting element or the respective connecting elements can moreover advantageously be used to compensate for tolerances. For this purpose, the connecting element can comprise, for example, a damper or a flexible element, for example, a rubber sleeve or the like arranged on at least one of the opposing sides provided for connecting the electrolytic cell stacks. This can advantageously enable a tolerance compensation without reducing a mechanical stability of the individual electrolytic cell stacks and/or increasing the production expenditure thereof. Additionally or alternatively, the hydraulic interfaces, i.e., the feeds and drains, can be formed as flexible hose elements or can be connected on sides of the connecting element to flexible hose elements. These hose elements can be fastened movably on the main body of the connecting element. The main body can comprise respective recesses or pockets for accommodating the hose elements in this case. The hose elements can be connected on the respective end thereof facing toward the main body to rigid pipes led or extending into the main body.

In the meaning of the present invention and/or in the present description, water, which is mentioned multiple times, is to be understood as representative of an arbitrary electrolysis fluid and corresponding water lines, water circuits, hydraulic fittings, and the like are also not restricted to conducting through or using water. The utilized terms "hydraulics" and "hydraulic" and the variants thereof each indicate the reference to a corresponding fluid system of the present invention and/or a corresponding use and do not relate, for example, to devices for hydraulic force transmission, hydraulic transmissions, or the like. A hydraulic interface in this meaning is thus, for example, a pipe fitting through which water can flow or can be conducted. The hydraulic system of the connecting element or a facility or arrangement implemented using the connecting element can accordingly, for example, comprise the hydraulic interfaces, water fittings, water lines, pipes, reservoirs, and the like thereof.

Furthermore, the feeds and drains mentioned herein can be referred to jointly as hydraulic interfaces. A feed can become a drain and vice versa due to a typically possible reversal of the respective flow direction. Such a reversal can be possible for one or both water circuits independently of one another. Accordingly, a hydraulic interface referred to above and hereafter as a feed can also function as a drain and a hydraulic interface referred to as a drain can function as a feed.

In one advantageous design of the present invention, the connecting element for each water circuit comprises at least one hydraulic external fitting connected thereto by a pipe for connecting an external water line different from the electrolytic cell stacks.

For the continuous operation of the electrolysis, the corresponding fluid, i.e., for example, the water here, typically has to be resupplied regularly or continuously from an external source and discharged from the electrolytic cell stacks. This can advantageously take place via the external fittings, i.e., the external fittings of the connecting element, via which an exchange of the water between the connecting element, in particular a line system or hydraulic system of the connecting element, and an external source or environment thus can be carried out. Water can thus be conducted, for example, from the respective external source or via the external water line through or via an external fitting into the connecting element and/or into the hydraulic or line system of the connecting element and can reach one of the water circuits via this.

Following this path, the water can then be conducted via a drain of the connecting element into a connected electrolytic cell stack. After the water has passed through the electrolytic cell stack, it can arrive back in the connecting element via a feed thereof. Subsequently, the water can be discharged via a further external fitting into an external water line, for example, to be supplied again to preparation or disposal and/or to the electrolytic cell stack. Without the external fitting or fittings of the connecting element, for example, for the continuous operation of the electrolysis, the water or the respective electrolysis fluid could or would then have to be supplied directly, for example, via a corresponding fitting and/or a corresponding hydraulic interface of the respective electrolytic cell stack to this stack. By way of the design of the connecting element described here, the water or water supply of the electrolytic cell stack can thus advantageously be arranged at the connecting element and/or implemented via the connecting element centrally and thus if necessary accessible particularly easily and safely, i.e., with little risk.

The respective external fitting can be identical in this case to one of the feeds and/or drains, i.e., to one of the feeds and/or drains of the respective water circuit. For example, the first feed can be an external fitting, i.e., can be formed as an external fitting. Additionally or alternatively, for example, the second drain can be such an external fitting.

At least one external fitting can also be provided for one or both water circuits in each case in addition to the respective feed and drain. For example, such an additional external fitting can be provided for each feed and drain, via which, upon connection of an electrolytic cell stack, a hydraulic contact and/or a hydraulic connection is established between this electrolytic cell stack and the connecting element. In other words, the feeds and drains of the connecting element are then used as a transition for a fluid, in particular the water used for the electrolysis, between the connecting element and the respective electrolytic cell stack, while the external fittings form a respective hydraulic interface to an external hydraulic system or line system, i.e., one different from the connecting element and also from the electrolytic cell stacks.

In the present invention, in a first alternative the connecting element is formed as an end element or end cap for a first of the two electrolytic cell stacks. The electrical terminals and mechanical connecting interfaces associated with this electrolytic cell stack are formed in this case for directly attaching and/or connecting this electrolytic cell stack to the connecting element. The electrical terminals and mechanical connecting interfaces associated with the second of the two electrolytic cell stacks are formed for attaching and/or connecting to a structurally identical connecting element used as an end element or end cap of the second electrolytic cell stack.

In the case of electrolytic cell stacks connected or coupled to one another by the connecting element, in other words only one of the two electrolytic cell stacks is thus directly connected to the connecting element, while the other electrolytic cell stack is connected indirectly, i.e., connected or coupled with mediation via a further, structurally-identical connecting element indirectly to the connecting element at which the abovementioned electrolytic cell stack is connected directly, i.e., immediately. In such an arrangement, the sequence electrolytic cell stack, connecting element, connecting element, electrolytic cell stack thus results observed along the stack axes. Such a composite can thus have a plane of reflection or symmetry which extends perpendicularly to the stack axes between the two connecting elements and/or in the contact surface or contact plane thereof. The two electrolytic cell stacks are thus electrically and mechanically connected to one another in this case too, wherein the two connecting elements can be understood jointly as a two-part connecting element.

One advantage of such a divided, modular construction can be that each electrolytic cell stack can be routinely equipped with a connecting element as an end element or end cap, i.e., can be terminated. A larger or more complex electrolysis facility can then be constructed flexibly and modularly using simplified logistics from such composites made of in each case one electrolytic cell stack and one connecting element arranged thereon, since a separate installation of electrolytic cell stacks and connecting elements on location is not necessary, but rather the equivalent end pieces of the composites merely have to be coupled. Moreover, by arranging such a connecting element as an end element or end piece on an electrolytic cell stack, it can advantageously already be protected from damage during a transportation or an installation procedure, for example.

In this alternative of the invention, the feeds and drains, i.e., the hydraulic interfaces, of the first and second water circuit are associated with the first electrolytic cell stack, so that water of the first electrolytic cell stack can flow through the connecting element only when electrolytic cell stacks are connected thereto and thus the connecting element forms a hydraulic partition between the electrolytic cell stacks. In other words, the feeds and drains of both water circuits are thus used for supplying or removing, respectively, water to or from the first electrolytic cell stack. Neither the first nor the second water circuit is thus hydraulically connected to the second electrolytic cell stack or its water circuits. Thus, with two connected electrolytic cell stacks, a hydraulic, i.e., water-conducting or water-guiding connection is not formed between the respective hydraulic systems of the electrolytic cell stacks connected to the connecting element by the hydraulic system of the connecting element.

The two feeds and drains of the two water circuits can be provided as hydraulic interfaces between the connecting element and the first electrolytic cell stack. For this purpose, the feeds and drains of both water circuits can advantageously be arranged on one single side of the connecting element to enable an advantageously simple hydraulic connection of the electrolytic cell stack to the connecting element. At least one external fitting can additionally also be provided in this exemplary embodiment, of course. The first feed or drain and the second feed or drain can also be formed as external fittings, for example.

By means of a connecting element used as a hydraulic partition or as a hydraulic partition element between electrolytic cell stacks connected thereto, it is thus possible to electrically and mechanically connect multiple electrolytic cell stacks to one another but simultaneously hydraulically separate them. This can particularly advantageously enable a usage and/or an application of the present invention in a self-supplying electrolyzer.

In a self-supplying electrolyzer, i.e., in self-supplying electrolysis, a gas flow arising because of the process due to the water splitting, for example, is used to aspirate or reconvey further water required for the process, i.e., the progressing, continuous electrolysis. The gas generation process inherent to electrolysis thus drives the respective water circuit, i.e., the aspiration or reconveyance and the corresponding discharge or removal of the water independently, without a pump being required.

However, the application of the self-supplying electrolysis is possible only for a relatively limited number of electrolytic cells connected in series, wherein this number of electrolytic cells is in particular less than the number of the electrolytic cells present in total in the two electrolytic cell stacks connected by means of the connecting element. An electrolytic cell stack can comprise, for example, 250 electrolytic cells, which can be organized and/or arranged, for example, into five modules of 50 electrolytic cells each. The self-supplying electrolysis can be successfully applied according to the present prior art, in contrast, for example, for 2 to 100 electrolytic cells hydraulically connected in series. This is to be attributed to the fact that technically related asymmetries in a flow field of the water flow or the water circuit between the cells and also a flow resistance, which increases with rising number of electrolytic cells, in particular in the intake region, result in technical problems. These can be, for example, a water deficiency, local overheating due to excessively high current densities, or local cooling down to below a minimal efficient operating temperature. For these reasons, up to now electrolytic cell stacks or modules having a relatively small number of electrolytic cells suitable for the self-supplying electrolysis have been used for known self-supplying electrolyzers, in order to avoid corresponding critical states. This is accompanied by the necessity of a separate current supply and equipment with hydraulic interfaces in each case. This in turn has heretofore resulted in a high technical and financial expenditure and a low efficiency, since due to the low number of electrolytic cells, a total voltage drop over all electrolytic cells cannot be adapted satisfactorily to a voltage level provided at the electrical supply. For example, if 50 electrolytic cells having a voltage drop of 2 V each are assembled, a voltage level of only approximately 100 V thus results over the entire composite, which is very remote from a utilization of the voltage level providable by the electric supply of, for example, 1500 V. The present invention thus advantageously enables, by way of the electrical connection in series of the electrolytic cells with hydraulic partition at the same time, the self-supplying electrolysis to be applied and improved electrical efficiency to be achieved at the same time by improved utilization of the voltage provided by the electrical supply. In particular, this is enabled in a compact electrolysis device which is particularly simple to manage.

If an electrolytic cell stack comprises more electrolytic cells than can be coupled in series for a self-supplying electrolysis, thus, for example, two separate hydraulic systems each having two independent water circuits can be provided for this electrolytic cell stack. Accordingly, for example, at least two hydraulic interfaces of the connecting element can be associated with a first of the two hydraulic systems and at least two further hydraulic interfaces of the connecting element can be associated with a second of the two hydraulic systems.

In the present invention, in a second alternative the connecting element additionally comprises a third feed and a third drain, i.e., a third set of two hydraulic interfaces, for a third water circuit, and a fourth feed and a fourth drain, i.e., a fourth set of two hydraulic interfaces, for a fourth water circuit, wherein all four water circuits are independent of one another, i.e., are separated. In other words, four water circuits are thus provided, each of which respectively comprises a feed and a drain or two hydraulic interfaces, respectively, which are each connected to one another by means of a respective pipe.

It is not provided here and also in terms of other embodiments of the connecting element according to the invention that the respective water circuit is entirely part of the connecting element itself as an actually closed circuit. It is only to be expressed here that according to the invention, the connecting element comprises multiple pipe sections accessible separately through the respective hydraulic interfaces, i.e., portions of the hydraulic system, which are not hydraulically connected to one another and are therefore usable as portions or sections of separate water circuits, which are thus independent from one another, or are used when electrolytic cell stacks are connected, respectively.

The hydraulic interfaces, i.e., the feeds and drains, for the first water circuit and for the second water circuit are associated in this case with a first of the two electrolytic cell stacks and the hydraulic interfaces, i.e., the feeds and drains, for the third water circuit and for the fourth water circuit are associated with a second of the two electrolytic cell stacks. Such an association means in this case that the respective electrolytic cell stack is intended to be connected to the hydraulic interfaces associated with it, so that when the electrolytic cell stack is connected, a corresponding water circuit of this electrolytic cell stack is hydraulically connected to the corresponding, associated water circuit of the connecting element.

When the electrolytic cell stacks are connected to the connecting element, water of both electrolytic cell stacks can thus flow through said connecting element simultaneously and at the same time the connecting element forms a hydraulic partition between the electrolytic cell stacks. In other words, in this case the connecting element thus comprises at least eight hydraulic interfaces, of which four are associated with the one electrolytic cell stack and/or are connected thereto and the remaining four are associated with the other electrolytic cell stack and/or are or become connected thereto. This can be understood by way of illustration as a combination or unification of two connecting elements, each having four hydraulic interfaces, described herein at another point, and each described as an end element or end cap for an electrolytic cell stack.

Depending on the specific application, for example, a replacement of an electrolytic cell stack, for example, for repair purposes, can be simplified by such a monolithic connecting element having at least eight hydraulic interfaces, which thus comprises all hydraulic, electrical, and mechanical terminals, connections, and interfaces for connecting at least two electrolytic cell stacks. This can be the case since, for example, a separate connecting element is not required for the respective new electrolytic cell stack nor does it have to be detached from the electrolytic cell stack to be replaced. Due to the monolithic construction of the connecting element, the number of connections or interfaces between separate components can moreover be reduced, which can result in a reduced susceptibility to leaks.

In a further advantageous design of the present invention, the connecting element comprises pipes for the two water circuits, which connect the respective feed to the respective drain—i.e., the respective hydraulic interfaces to one another—so that when electrolytic cell stacks are connected, the connecting element thus forms or establishes a hydraulic connection of the electrolytic cell stacks or of the water circuits thereof, respectively. The pipes can thus extend completely through the connecting element, for example, from one of the two opposing sides to the other. The connecting element can thus comprise on one side, for example, two feeds or one feed and one drain for the hydraulic connection of one, i.e., the first electrolytic cell stack. On the other side, the connecting element can then accordingly comprise two drains or one drain and one feed for the hydraulic connection of the other, i.e., the second electrolytic cell stack. For example, the water of the first water circuit, which passes from the first electrolytic cell stack through the first feed into the connecting element, can thus flow through the pipe adjoining thereon through the first drain out of the connecting element into the second electrolytic cell stack. This can apply accordingly to the water of the second water circuit flowing through the connecting element, possibly also with reversed flow direction, through the second feed and the second drain between the two electrolytic cell stacks.

In the embodiment described here, the connecting element thus represents or establishes both the electrical and mechanical connection and also the hydraulic connection of the two electrolytic cell stacks. By means of the connecting element, in particular multiple electrolytic cell stacks can be electrically and hydraulically connected in series, whereby the efficiency of a correspondingly constructed electrolysis facility can advantageously be increased with reduced cost and component expenditure at the same time. The structural-mechanical limitations described at another point, which limit the maximum length or structural length, i.e., electrolytic cell number of an electrolytic cell stack, can thus be effectively bypassed. The maximum possible voltage level of a rectifier connected upstream can thus be electrically utilized by serial interconnection of electrolytic cell stacks, i.e., an optimum voltage adaptation can thus be achieved independently of the structural limitations of the individual electrolytic cell stacks. Due to the hydraulic connection of the electrolytic cell stacks by means of the connecting element, a continuous water circuit can be implemented over multiple electrolytic cell stacks, whereby a number of external hydraulic interfaces for connection to an external water supply or an external hydraulic system can advantageously be minimized. This is also advantageously accompanied by a minimization of a complexity and an installation expenditure of the entire electrolysis facility.

In one refinement of the present invention, the connecting element can additionally comprise further hydraulic interfaces. These can be, for example, a first further feed, a first further drain, a second further feed, and a second further drain. In this case, each of the thus at least four feeds can be connected to precisely one of the thus at least four drains by a respective pipe. These pipes thus also extend through the connecting element here in such a way that when electrolytic cell stacks are attached to the connecting element, the connecting element forms or establishes a hydraulic connection of the water circuits of the first electrolytic cell stack to the corresponding water circuits of the second electrolytic cell stack. The connecting element can thus in other words, for example, comprise on one side two feeds and two drains for hydraulically connecting the first electrolytic cell stack. On the other side, for example, on the opposing side, the connecting element can accordingly comprise two drains and two feeds for hydraulically connecting or attaching the second electrolytic cell stack. Using such an arrangement, for example, a back-and-forth flow through the electrolytic cell stack can be enabled for both independent water circuits respectively for both electrolytic cell stacks. This can be advantageous, for example, if a respective central external inflow and outflow, i.e., the connection to an external hydraulic system, is arranged on the connecting element. A hydraulic interface then advantageously does not have to be provided on the respective ends of the electrolytic cell stacks facing away from the connecting element, whereby a particularly simple space-saving installation can be enabled. Such a configuration of the connecting element can also be used, for example, for respectively attaching two electrolytic cell stacks on each side, wherein each of these electrolytic cell stacks, of which there are thus four, can each be hydraulically connected to the connecting element by two hydraulic interfaces—for example, one feed and one drain each or two identical hydraulic interfaces each, for example, if the electrolytic cell stacks only have through flow in one direction in relation to the connecting element. A particularly compact electrolysis facility can thus be implemented.

The connecting element according to the invention can in all embodiments only comprise as hydraulic interfaces the respective hydraulic interfaces mentioned or described here. The connecting element according to the invention can also comprise, however, respective further hydraulic interfaces, for example, if it is used as a node point of a hydraulic system, which is more complex in particular. Thus, for example, a conduction of water through to a further connecting element or a further electrolytic cell stack can be arranged or implemented on or in the connecting element according to the invention.

In one advantageous refinement of the present invention, the feeds, the drains—thus the hydraulic interfaces—and the pipes are formed to be pressure-retaining, i.e., as pressure-retaining components. In particular, they are formed to withstand an internal pressure of at least 35 bar. For this purpose, correspondingly stable connections can thus be provided, for example. In particular if the pipes are not formed as cavities or recesses in the rigid main body, which is otherwise solid, for example, they can be formed, for example, as corrugated pipes or fabric hoses.

Due to the hydraulic connection of the electrolytic cell stacks by means of the connecting element and particularly due to the pressure-retaining or pressure-stable embodiment of the hydraulic interfaces and pipes, the connecting element is advantageously suitable for use in or as part of a pressure electrolysis device. In pressure electrolysis, the water is pumped by means of a pump under pressure through the water circuits; forced circulation thus takes place. More electrolytic cells can thus be operated hydraulically connected in series than in the case of self-supplying electrolysis.

In one advantageous design of the present invention, the mechanical connecting interfaces are formed as flanges of one, several, or all of the hydraulic interfaces, i.e., the feeds and/or the drains, to establish a mechanical connection of an external component—for example, of an electrolytic cell stack or a further connecting element—to the connecting element. In other words, the correspondingly formed interfaces are thus combined mechanical-hydraulic interfaces. For example, in each case the flange can enclose or form an end piece of the respective pipe ending or beginning at the hydraulic interface. Therefore, with particularly low expenditure, both the mechanical and also the hydraulic connection of the respective electrolytic cell stack to the connecting element can be implemented. Because the respective mechanical connection is arranged, and thus takes place, directly at the hydraulic interface in this case, a particularly high level of leak-tightness and/or pressure stability of the respective hydraulic connection can moreover advantageously be achieved without additional expenditure.

In one advantageous design of the present invention, at least one settable component, in particular an aperture and/or a throttle and/or a valve, for setting a respective water flow—thus a flow and/or a mass or volume flow of water flowing through—is arranged in or on one, multiple, or all of the feeds and drains and/or pipes adjoining thereon of the connecting element. The respective water flow flowing through the hydraulic interface or pipe can advantageously be set as needed by the settable component or the settable components. A pressure regulation can also advantageously be implemented in the hydraulic system via this. The use or arrangement of multiple such settable components can moreover advantageously enable individual parts or sections of the hydraulic system to be drained separately, which can facilitate maintenance or repair work, for example. A simultaneous operation of different electrolytic cell stacks on the connecting element can also particularly advantageously be enabled by a corresponding setting, control, or regulation of the settable components. This can be useful, for example, if the different electrolytic cell stacks set different requirements for a respective water flow or flow rate and/or have different gas production capacities, for example.

In one advantageous design of the present invention, the connecting element additionally comprises an openable and closable intermediate drain and intermediate feed connected to one, in particular to only one of the water circuits by a pipe. Water flowing through the connecting element can be diverted and/or supplied via this, as needed. In particular, a settable part or portion of the water flowing through the connecting element can be diverted or supplied, respectively, via this, i.e. diverted and/or supplied, wherein this portion is settable by means of at least one settable valve arranged in or on the intermediate drain and/or the intermediate feed. In other words, a settable part of a water flow flowing through the connecting element and/or the respective water circuit, i.e., the corresponding mass or volume flow, can thus be supplied at the connecting element, for example, to an external hydraulic system or an external device or conducted through an external device, in particular after this part or portion of the water has flowed through one of the connected electrolytic cell stacks but before it flows or arrives in the other connected electrolytic cell stack. This advantageously enables a conditioning or adaptation, for example, thermal and/or chemical, of the water—or in general of the electrolysis fluid used, in particular between flowing through the two electrolytic cell stacks. This in turn enables improved or optimized electrolysis operation of both connected electrolytic cell stacks, since, for example, optimally conditioned water can be supplied in each case.

For example, overheating of the electrolytic cell stacks or the electrolytic cells can thus be avoided particularly efficiently, since the heated water can remove process heat from the electrolytic cell stack efficiently via the intermediate drain. Heated water can also be supplied via the intermediate feed, for example, to ensure efficient electrolysis operation. For example, it can thus be ensured that water flowing to the electrolytic cell stack hydraulically downstream of the intermediate feed has at least a predetermined minimum temperature, for example, at least 40° C., since the electrolysis can run significantly less efficiently below this temperature. Faster starting of the electrolysis procedure or the electrolysis device and/or faster achievement of a maximum efficiency from a previously turned off operating state can thus advantageously also be enabled.

A controller or a regulating unit can advantageously be arranged on or in the connecting element, in particular can be part of the connecting element. By means of this controller or regulating unit, for example, the settable valve and/or at least one other settable component can be automatically activated, i.e., adjusted or set. This automatic activation can take place, for example, in dependence on a measured temperature of the water flowing through the connecting element, in dependence on an internal pressure or water pressure present in the hydraulic system, and/or in dependence on a measured gas production of the connected electrolytic cell stacks. Corresponding sensors can be provided for this purpose, which can be, for example, part of the connecting element or part of a corresponding electrolysis device.

In one advantageous design of the present invention, the connecting element comprises a heating and cooling unit for the temperature control of water flowing through the connecting element. The heating and cooling unit can in particular comprise an electrical heating element and/or a radiator, which is advantageously actively ventilated. Such a heating and cooling unit can advantageously enable a particularly rapid temperature control of the water, since it takes place directly on or in the connecting element itself. The heating and cooling unit can alternatively or additionally be configured, i.e., operated, for a temperature control or conditioning of water diverted via the intermediate drain and/or supplied via the intermediate feed.

In one advantageous design of the present invention, the connecting element comprises an electrical switch element for reversibly interrupting the electrical connection of the electrical terminals to one another. In other words, an electrical switch element is thus provided, by means of which the electrical connection of the electrolytic cell stacks can be interrupted when electrolytic cell stacks are attached to the connecting element. In this way, even if both electrolytic cell stacks are attached to the connecting element, advantageously only one of the two electrolytic cell stacks can be electrically operated as needed, for example, i.e., actually used for electrolysis. This can be independent of the hydraulic system, i.e., independent of a water flow or water stream. Particularly efficient operation of the electrolysis device can advantageously be achieved by the opening and closing of the electrical switch element as needed, since, for example, an optimum voltage adaptation can be performed with minimal expenditure. Thus, for example, an operation of a single electrolytic cell stack at full load can be more efficient than a respective part-load, simultaneous operation of both electrolytic cell stacks. Aging of the electrolytic cell stacks can advantageously be slowed by the avoidance thus enabled of a part-load operation.

In one advantageous design of the present invention, the connecting element comprises a voltage source and/or voltage sink, which is settable or variable in particular, and which is electrically connected to the electrical terminals or is/are connectable by means of a respective upstream electrical switch. The voltage source and/or—for example, depending on polarity—voltage sink can advantageously enable a particularly accurate adaptation of a voltage level to an external electric supply, for example, to improve an efficiency of the electrolysis device.

The electrolysis device according to the invention comprises a connecting element according to the invention and two electrolytic cell stacks electrically and mechanically connected thereto.

In addition, the electrolysis device according to the invention can comprise further component parts or units, for example, a water reservoir, a unit for temperature control and/or conditioning of the water used for the electrolysis, a pump for pumping the water through the electrolysis device, i.e., for driving the water flow or a water circulation, a gas collection unit for capturing the gas produced by the electrolytic cell stacks, and/or more of the like.

In one refinement of the electrolysis device according to the invention, it comprises two further connecting elements according to the invention, which are arranged on ends of the electrolytic cell stacks facing away from the central connecting element connecting the electrolytic cell stacks. Due to this remote or exterior arrangement or position, the two further connecting elements are referred to here as distal connecting elements.

The distal connecting elements can be designed identically to the central connecting element. This can enable, for example, a series circuit of further electrolytic cell stacks or electrolysis devices with the electrolysis device according to the invention.

However, the distal connecting elements can also be formed differently from the central connecting element. For example, the central connecting element can be completely penetrated by pipes to hydraulically connect the electrolytic cell stacks to one another. In contrast, the distal connecting elements can be formed, for example, as end elements or end caps and can close or terminate, i.e., delimit, the water circuits of the electrolytic cell stacks to the outside, i.e., thus in a direction facing away from the central connecting element along the stack direction. The distal connecting elements can then, for example, deflect a water stream or water flow originating from the central connecting element and flowing through the respective electrolytic cell stack up to the respective distal connecting element, so that it streams or flows through the respective electrolytic cell stack again in the reverse direction up to the central connecting element. This can advantageously enable a particularly simple and central hydraulic contacting of the electrolysis device on the central connecting element.

Independently of the other embodiment thereof, the connecting element according to the invention and the electrolysis device according to the invention can be used for PEM electrolysis ("proton exchange membrane" or "polymer electrolyte membrane"), i.e., can be formed for this purpose.

The properties and refinements of the connecting element according to the invention specified above and hereafter and also the corresponding advantages are each transferable accordingly to the electrolysis device according to the invention and vice versa. The invention thus also includes those refinements of the connecting element according to the invention and the electrolysis device according to the invention which comprise embodiments which are not explicitly described here in the respective combination.

BRIEF DESCRIPTION OF THE DRAWINGS

Further features, details, and advantages of the present invention result from the following description of advantageous exemplary embodiments and on the basis of the drawings. In the figures.

DETAILED DESCRIPTION OF INVENTION

The exemplary embodiments explained hereafter are advantageous embodiments of the invention. In the exemplary embodiments, the described components of the embodiments each represent individual features of the invention to be considered independently of one another, which also each refine the invention independently of one another and are thus also to be considered a component of the invention individually or in a combination other than that shown. Furthermore, the described embodiments can also be supplemented by further ones of the above-described features of the invention In the FIGURES, identical, functionally identical, or corresponding elements are each identified by the same reference signs.

Figure 1:
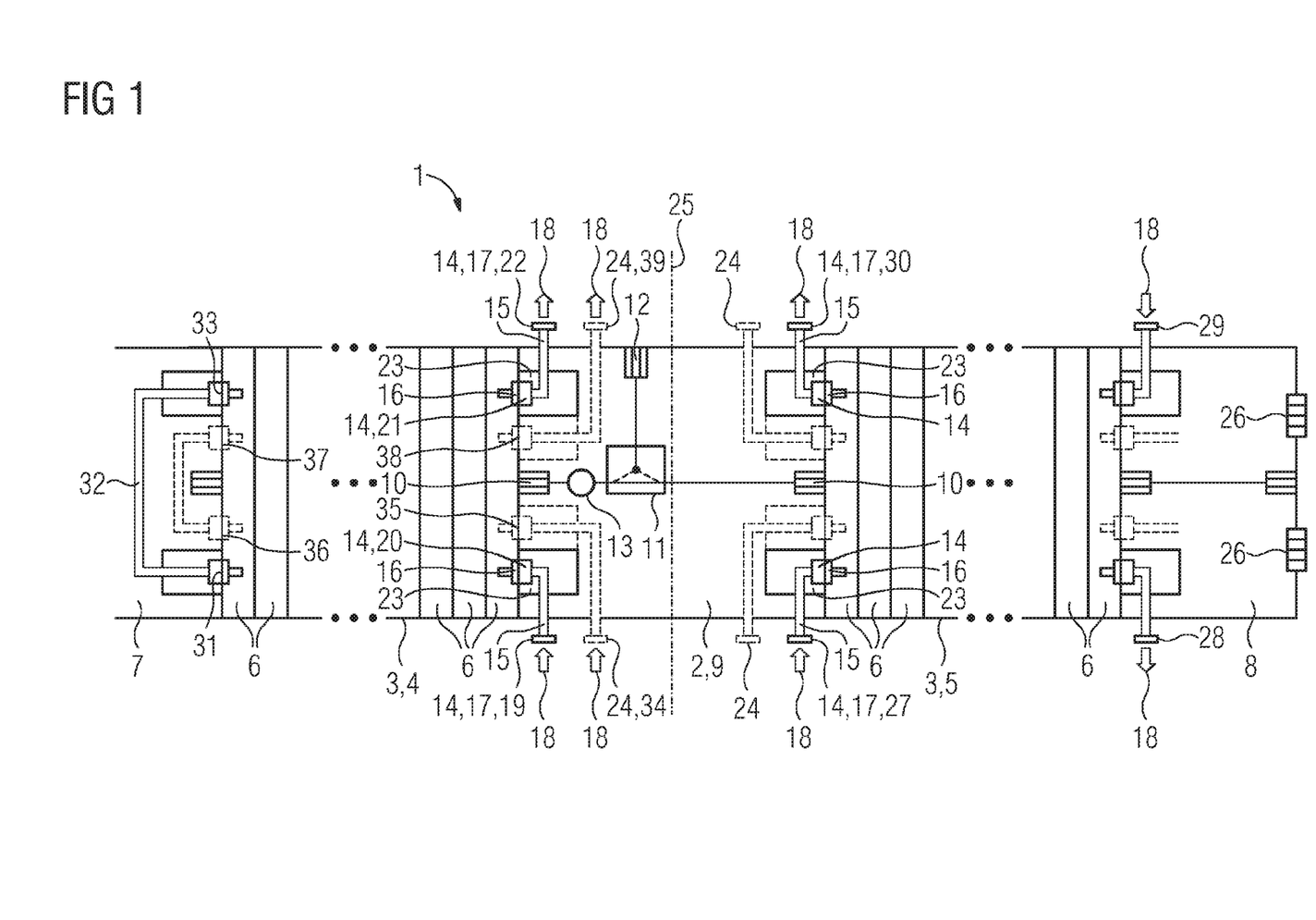
FIG. 1 shows a schematic side view of two electrolytic cell stacks which are electrically and mechanically connected to one another and hydraulically separated from one another by a connecting element.

FIG. 1 shows a schematic and partial side view of an electrolysis device 1, which comprises a centrally arranged connecting element 2 and two electrolytic cell stacks 3 connected thereto. The latter are a first electrolytic cell stack 4 and a second electrolytic cell stack 5, which are connected to the connecting element 2 on opposing sides thereof. The electrolytic cell stacks 3 each comprise a plurality of individual electrolytic cells 6, which are arranged at least substantially in parallel to one another in or along the respective stack direction or stack axis of the electrolytic cell stacks 3. By way of example, only a few electrolytic cells 6 are shown here, however, the electrolytic cell stacks 3 can comprise a plurality of further electrolytic cells 6. Furthermore, a first distal connecting element 7 and a second distal connecting element 8 are schematically indicated or shown here. The distal connecting elements 7, 8 are arranged on opposing sides of the electrolytic cell stacks 3 facing away from the central connecting element 2. The distal connecting elements 7, 8 can each be additional, separate components or they can be part of the electrolysis device 1.

The connecting element 2 comprises a rigid main body 9, in which further components of the connecting element 2 are embedded. The main body 9 can be formed depending on the requirements, for example, from a metallic or ceramic material or a plastic or a combination thereof. In the present case, the connecting element 2 comprises two electrical interfaces or electrical terminals 10 for the electrical connection or contacting of the two electrolytic cell stacks 3. The electrical terminals 10 are arranged in the present case on the sides of the connecting element 2, to which the electrolytic cell stacks 3 are also connected. This represents a advantageous possible arrangement, but not the only one. In particular if the electrical terminals 10 are arranged on another side of the connecting element 2, the respective electrical connection to the electrolytic cell stacks 3 can be established, for example, by means of a correspondingly led electrical line. The electrical terminals 10 are connected to one another by means of an electrical line extending through the connecting element 2, so that the two electrolytic cell stacks 3 are also electrically connected to one another, in particular connected in series, via this.

In the present case, the connecting element 2 comprises an electrical switch element 11 at this electrical line, by means of which the electrical connection of the two electrical terminals 10 and thus of the two electrolytic cell stacks 3 can be reversibly interrupted or established, respectively, as needed. In this case, for example, an electrical connection of one of the two electrolytic cell stacks 3 can be established to an electrical alternative terminal 12 of the connecting element 2. This can advantageously enable an individual operation of the connected electrolytic cell stacks 3. The electrical alternative terminal 12 can be or become connected, for example, to an external electrical energy supply.

In the present example, the connecting element 2 additionally comprises a settable or variable electrical voltage source 13 connected to the electrical line, by means of which a voltage level can be influenced. In this way, for example, a voltage and/or power adaptation can be implemented with respect to the external electrical energy supply, by means of which the electrolytic cell stacks 3 are operated.

In addition to the electrical connection of the two electrolytic cell stacks 3, the connecting element 2 is used for mechanically and hydraulically connecting or contacting the two electrolytic cell stacks 3. In the embodiment shown in the present case, the electrolytic cell stacks 3 and the connecting element 2 are mechanically coupled to one another to form the electrolysis device 1. Both the first electrolytic cell stack 4 and also the second electrolytic cell stack 5 are each hydraulically connected here to the connecting element 2, thus to a hydraulic system of the connecting element 2, but not to one another. In other words, the connecting element 2 hydraulically separates the two electrolytic cell stacks 3 from one another, and thus forms a hydraulic partition element between the two electrolytic cell stacks 3.

The hydraulic system of the connecting element 2 comprises hydraulic interfaces 14, of which the connecting element 2 comprises a plurality here. Furthermore, the hydraulic system of the connecting element 2 comprises pipes 15, which each connect two of the hydraulic interfaces 14 to one another. In the present composite, i.e., with electrolytic cell stacks 3 connected to the connecting element 2, the respective hydraulic connections of the connecting element 2 to the first electrolytic cell stack 4, on the one hand, and to the second electrolytic cell stack 5, on the other hand, are established by means of corresponding respective hydraulic fittings 16 of the electrolytic cell stacks 3. For this purpose, the hydraulic fittings 16 are connected to the corresponding hydraulic interfaces 14 of the connecting element 2 arranged on the respective side of the connecting element 2. In this case, some or all of the hydraulic interfaces 14 and the hydraulic fittings 16 can comprise flanges or can be formed as flanges to establish or enable the mechanical connection of the electrolytic cell stacks 3 to the connecting element 2 simultaneously in a simple and space-saving manner.

Hydraulic interfaces 14 not provided for hydraulic connection to one of the electrolytic cell stacks 3, thus to one of the hydraulic fittings 16, can be, for example, external fittings 17. These external fittings 17 can be used for the hydraulic connection of the connecting element 2, more precisely its hydraulic system, to an external water line or water supply, thus to an external hydraulic system.

Depending on a flow direction given in a specific application of water flowing through the hydraulic system of the connecting element 2 and accordingly the electrolytic cell stacks 3, the individual hydraulic interfaces 14 and the individual hydraulic fittings 16 can each be a feed or a drain. For example, a possible flow direction is indicated here by arrows 18. Accordingly, the set of the hydraulic interfaces 14 for the first electrolytic cell stack 4 comprises a first feed 19, a first drain 20, a second feed 21, and a second drain 22. The first feed 19 and the first drain 20 can be part of a first water circuit in this case, while the second feed 21 and the second drain 22 can be part of a second water circuit, which is separate or independent therefrom. This applies accordingly for the second electrolytic cell stack 5. The two electrolytic cell stacks 3 can thus accordingly each have two independent water circuits flowing through them, of which one can be used, for example, to obtain hydrogen gas and the other to obtain oxygen.

The hydraulic interfaces 14 provided for the hydraulic connection of the connecting element 2 to the electrolytic cell stacks 3 can each be arranged, for example, in a pocket or recess 23. In this way, space can be provided to achieve a flush connection between the connecting element 2 and the electrolytic cell stacks 3 and/or, for example, to provide space for a movement of a movable suspension and/or a flexible section of the respective pipe 15 and/or to facilitate an installation of the electrolysis device 1.

Depending on the specific embodiment or specific requirements, the hydraulic system of the connecting element 2 can comprise further components. By way of example, a further set 24 of hydraulic interfaces and corresponding pipes, i.e., hydraulic connections, is indicated for this in the present case. Such further hydraulic components enable, for example, complex water guides, for example, guiding back and forth through the respective electrolytic cell stack 3 in separate water circuits. For this purpose, the further hydraulic components 24 can comprise or be, for example, further feeds, drains, external fittings, and the like.

In the embodiment illustrated here, the connecting element 2 comprises a total of at least eight hydraulic interfaces 14. However, a partition line can also extend along a central transverse plane 25 indicated here, for example, at which two connecting elements are connected to one another, each of which then comprises, for example, only four hydraulic interfaces 14—possibly supplemented with the respective further hydraulic components 24. Such a structural form of a connecting element is indicated here in the form of the second distal connecting element 8. Like the connecting element 2, the second distal connecting element 8 also comprises electrical and hydraulic interfaces and can moreover also comprise optional components (not shown here), corresponding, for example, to the switch element 11, the alternative terminal 12, the voltage source 13, and/or the further hydraulic components 24. In contrast to the connecting element 2, the second distal connecting element 8 comprises, on its side facing away from the second electrolytic cell stack 5, mechanical interfaces 26 indicated here by way of example, which are provided and formed for mechanically connecting the second distal connecting element 8 to a further connecting element (not shown here).

The mechanical interfaces 26 can be combined in this case, for example, with an electrical interface to enable an electrical connection between the second distal connecting element 8 and the further connecting element (not shown here). In the arrangement shown here, for example, the water used for the electrolysis in the second electrolytic cell stack can pass in a first water stream from an external source or water supply via a hydraulic interface 27 into the connecting element 2 and from there via the pipe 15 adjoining thereon into the second electrolytic cell stack 5. The water can then pass through this stack in a first water circuit up to the second distal connecting element 8, from which it can be led out via a hydraulic interface 28. In a second water circuit of the second electrolytic cell stack 5 independent thereof, for example, a corresponding second water stream can pass via a hydraulic interface 29 from an external source or supply into the second distal connecting element 8 and further into the second electrolytic cell stack 5. It then flows through this in the second water circuit up to the connecting element 2, which the second water stream can leave again, for example, via a hydraulic interface 30. In this arrangement, the second distal connecting element 8 can thus be formed as an end element or end cap of the second electrolytic cell stack 5.

In the first distal connecting element 7, an alternative configuration of the hydraulic system is indicated by way of example. In this possible configuration, for example, a first water stream for the first electrolytic cell stack 4 can flow from an external water supply into the first feed 19 and further via the first drain 20 into the first electrolytic cell stack 4. This first water stream can then flow through this stack up to a hydraulic interface 31, at which the first electrolytic cell stack 4 is hydraulically connected to the first distal connecting element 7. This first water stream can then flow through a deflection pipe 32 adjoining the hydraulic interface 31 through the first distal connecting element 7 up to a further hydraulic interface 33, at which it can again enter the first electrolytic cell stack to flow through it in the reverse direction back to the connecting element 2. In this case, however, the first water stream enters the connecting element 2 via the second feed 21, in order to then leave it via the second drain 22. Similarly and in parallel, for example, a second water stream in an independent second water circuit can pass from an external source through a hydraulic interface 34 indicated here into the connecting element 2 and can flow through it up to a further indicated hydraulic interface 35, where the second water stream can then pass over into the first electrolytic cell stack 4. Independently of the first water stream, this second water stream can then pass through the electrolytic cell stack 4 from the further hydraulic interface 35 up to a hydraulic interface 36, where it can enter the hydraulic system of the first distal connecting element 7. This second water stream can leave the latter again, after it has passed through the first distal connecting element 7 via a corresponding connecting pipe, at a hydraulic interface 37 by passing over into the first electrolytic cell stack 4 again. Furthermore, following the independent second water circuit of the first electrolytic cell stack 4, this second water stream can leave the first electrolytic cell stack 4 up to a further indicated hydraulic interface 38 by passing over into the connecting element 2 again. The second water stream can then exit from the connecting element 2, for example, via a further hydraulic interface 39 also indicated here.

Figure 2:
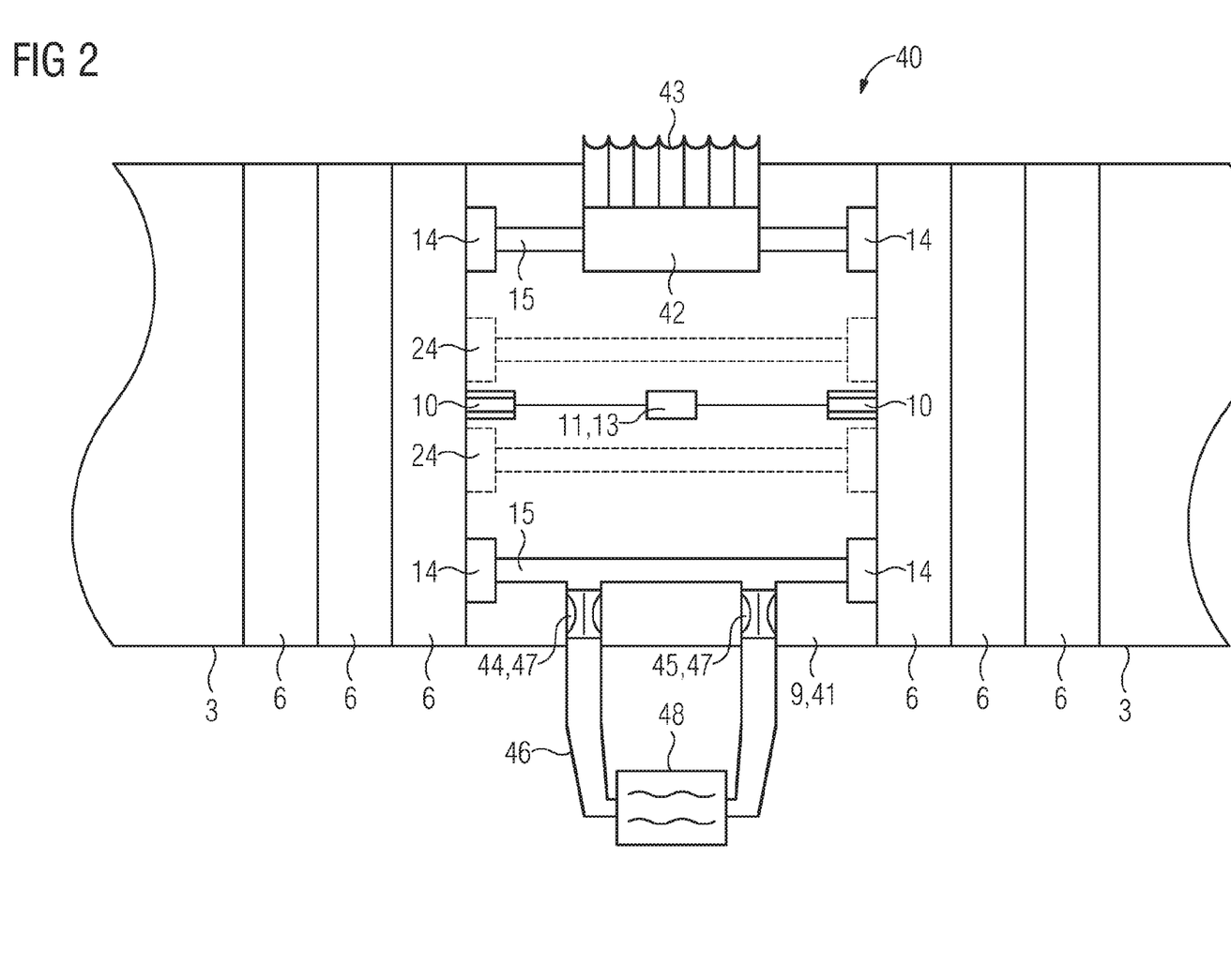
FIG. 2 shows a schematic and partial side view of an alternative variant of a connecting element which electrically, mechanically, and hydraulically connects two electrolytic cell stacks to one another.

FIG. 2 shows a schematic and partial side view of a second electrolysis device 40, in which a connecting element 41 also connects two electrolytic cell stacks 3 to one another in an alternative embodiment. The connecting element 41 can be formed identically or similarly to the connecting element 2 in an electrical and mechanical aspect in this case. The connecting element 41 thus also comprises electrical terminals 10, which are electrically connected to one another, for electrically connecting the two electrolytic cell stacks 3 connected to the connecting element 41. The connecting element 41 can also comprise, for example, component parts or components corresponding to the switch element 11, the alternative terminal 12, and/or the voltage source 13—even if they are not all explicitly shown here.

The connecting element 41 also comprises multiple hydraulic interfaces 14, which are hydraulically connected to one another in pairs using pipes 15. In addition, the connecting element 41 can also comprise further hydraulic components 24, for example, further feeds, drains, and pipes or the like.

The connecting element 41 is thus used, like the connecting element 2, for electrically and mechanically coupling two electrolytic cell stacks 3. In contrast to the connecting element 2, however, the connecting element 41 does not represent a hydraulic partition between the connected electrolytic cell stacks 3, but rather also hydraulically connects them to one another. In this case, a first water circuit of one of the electrolytic cell stacks 3 can be hydraulically connected to a first water circuit of the other of the electrolytic cell stacks 3 via a pipe 15 of the connecting element 41 and corresponding hydraulic interfaces 14. This can apply accordingly for respective second water circuits of the two electrolytic cell stacks 3.

Several further possible components or designs are to be explained on the basis of the example of the second electrolysis device 40, which can be applied similarly to the connecting element 2 and also the distal connecting elements 7, 8, i.e., can be transferred thereto.

In the present case, the connecting element 41 comprises a heating and cooling unit 42. The heating and cooling unit 42 is used for the controlled or regulated, in particular active, temperature control of the water flowing through the connecting element 41. For this purpose, the heating and cooling unit 42 can advantageously be arranged on a pipe 15, through which the water to be temperature-controlled flows or can flow, for example, enclosing the corresponding pipe 15. The heating and cooling unit 42 can comprise, for example, an electrical heater for heating the water and a heat sink or radiator 43 for cooling the water. To enable efficient cooling, the radiator 43, for example, can be coupled in a heat-conducting manner to the main body 9 of the connecting element 41 and/or can extend through the connecting element 41 up to its outer side, so that the radiator 43 can then dissipate, for example, emit heat absorbed from the water directly to an environment of the connecting element 41. The connecting element 41 can also comprise multiple corresponding heating and cooling units 42, in contrast to the illustration here, for example, a separate heating and cooling unit 42 can be arranged on each pipe 15, whereby a particularly accurate, individually adapted temperature control is advantageously enabled for different portions of the hydraulic system of the electrolysis device 40.

Furthermore, in the present case the connecting element 41 comprises an intermediate drain 44 and an intermediate feed 45 on one of the pipes 15, which hydraulically connect the corresponding pipe 15, i.e., the hydraulic system of the connecting element 41, to an external hydraulic system 46 in the present case. Water can be diverted from the pipe 15 in this case via the intermediate drain 44, i.e., conducted out of the connecting element 41, in particular directly, i.e., without firstly flowing through one of the electrolytic cell stacks 3. Correspondingly, water can also be introduced directly into the pipe 15 from the external hydraulic system 46 via the intermediate feed 45, i.e., supplied to the hydraulic system of the connecting element 41.

To be able to regulate a proportion of the water thus diverted and/or supplied, in the present case settable valves 47 are arranged in the intermediate drain 44 and the intermediate feed 45.

The external hydraulic system 46 can comprise, for example, a conditioning unit 48 for conditioning the diverted and/or the supplied water. By means of the conditioning unit 48, for example, the water can be temperature controlled, chemically prepared, and/or purified. Water for measurement or monitoring purposes can also be taken from the hydraulic system of the second electrolysis device 40, for example, via the intermediate drain 44 and the corresponding valve 47. Furthermore, the intermediate drain 44 and/or the intermediate feed 45 can be used for pressure regulation in the hydraulic system of the connecting element 41 or the second electrolysis device 40 as a whole. In contrast to the illustration here, the connecting element 41 can comprise more than one intermediate drain 44 and/or more than one intermediate feed 45, for example, on one, multiple, or all further pipes 15 and/or hydraulic interfaces 14. The connecting element 2 and the distal connecting elements 7, 8 can also comprise such intermediate drains 44 and/or intermediate feeds 45 and/or corresponding valves 47. All connecting elements 2, 7, 8, 41 can also comprise components or component parts at another point or other points of the respective hydraulic system, in particular settable component parts, such as apertures, throttles, and/or valves, for regulating a respective water stream, i.e., a respective mass or volume stream and/or a flow or flow speed.

The invention claimed is:

1. A connecting element for electrically and mechanically connecting two electrolytic cell stacks, the connecting element comprising:
   a rigid main body, which, for hydraulically connecting at least one of the electrolytic cell stacks, comprises at least four hydraulic interfaces in the form of a first feed and a first drain for a first water circuit and in the form of a second feed and a second drain for a second water circuit independent thereof, wherein hydraulic interfaces for independent water circuits are not hydraulically interconnected by a hydraulic system of the connecting element,
   electrical terminals connected to one another in an electrically conductive manner for electrically connecting the two electrolytic cell stacks, wherein the connecting element, when electrolytic cell stacks are connected to the electrical terminals, forms an electrical connection of the two electrolytic cell stacks in a shared circuit, and mechanical connecting interfaces for mechanically connecting the electrolytic cell stacks to the connecting element, wherein the mechanical connecting interfaces are arranged on opposing sides of the connecting element, so that when electrolytic cell stacks are mechanically connected to the connecting interfaces, the stack axes thereof extend in parallel to one another wherein a)

the connecting element is formed as an end element for closing and protecting a first of the two electrolytic cell stacks, the electrical terminals and mechanical connecting interfaces associated with this first electrolytic cell stack are formed for directly attaching and/or connecting this electrolytic cell stack, and the electrical terminals and mechanical connecting interfaces associated with the second of the two electrolytic cell stacks are formed for attaching and/or connecting to a structurally-identical connecting element used as an end element of the second electrolytic cell stack, and the feeds and drains of the first and second water circuit are associated with the first electrolytic cell stack, so that when electrolytic cell stacks are connected to the connecting element, only water of the first electrolytic cell stack can flow through this connecting element and it thus forms a hydraulic partition between the electrolytic cell stacks, or wherein b)

the connecting element additionally comprises a third feed and a third drain for a third water circuit and a fourth feed and a fourth drain for a fourth water circuit, wherein all four water circuits are independent of one another, and the feeds and drains for the first water circuit and for the second water circuit are associated with a first of the electrolytic cell stacks and the feeds and drains for the third water circuit and for the fourth water circuit are associated with a second of the electrolytic cell stacks, so that the connecting element, when electrolytic cell stacks are connected thereto, can have water of both electrolytic cell stacks flow through it simultaneously and at the same time forms a hydraulic partition between the electrolytic cell stacks.

2. The connecting element as claimed in claim 1, further comprising:

for each water circuit, at least one hydraulic external fitting connected thereto by a pipe for attaching at least one external water line different from the electrolytic cell stacks.

3. The connecting element as claimed in claim 1, wherein the mechanical connecting interfaces are formed as flanges on one, several, or all of the feeds and/or drains to establish a mechanical connection of an external component part to the connecting element.

4. The connecting element as claimed in claim 1, wherein at least one settable component part, and/or an aperture, and/or a throttle, and/or a valve, for setting a respective water stream is arranged in one, multiple, or all of the feeds and drains and/or pipes adjoining thereon of the connecting element.

5. The connecting element as claimed in claim 1, further comprising:

respectively at least one openable and closable intermediate drain and intermediate feed connected to one of the water circuits by a pipe, via which water flowing through the connecting element, or a proportion, which is settable by means of at least one settable valve arranged in or on the intermediate drain and/or the intermediate feed, of the water flowing through the connecting element, is divertable and/or supplied as needed.

6. The connecting element as claimed in claim 1, further comprising:

a heating and cooling unit for the temperature control of water flowing through the connecting element.

7. The connecting element as claimed in claim 1, further comprising:

an electrical switch element for reversibly interrupting the electrical connection of the electrical terminals.

8. The connecting element as claimed in claim 1, further comprising:

a voltage source and/or voltage sink which is electrically connected to the electrical terminals, when operated electrolytic cell stacks are connected, for optimizing a voltage level with respect to a predetermined criterion, or for a maximized electrolysis efficiency.

9. An electrolysis device, comprising:
a connecting element as claimed in claim 1, and
two electrolytic cell stacks electrically and mechanically connected to the connecting element.

10. An electrolysis device, comprising:
a connecting element and two further distal connecting elements, as claimed in claim 1, and
two electrolytic cell stacks electrically and mechanically connected to the connecting element,
wherein the two further distal connecting elements are arranged at ends of the electrolytic cell stacks facing away from the connecting element connecting the electrolytic cell stacks.

11. The connecting element as claimed in claim 6, wherein the heating and cooling unit comprises an electrical heating element, and/or a radiator, and/or
wherein the heating and cooling unit is actively ventilated.

12. The connecting element as claimed in claim 8, wherein the voltage source and/or voltage sink is settable.

* * * * *